United States Patent
Bachrany et al.

(10) Patent No.: US 8,510,222 B2
(45) Date of Patent: Aug. 13, 2013

(54) AUTOMATED TELLER MACHINE WITH VIRTUAL BANK SHARING

(75) Inventors: Vlamir Bachrany, Sao Paulo (BR); Tatiana C. da C. A. Blanco, Sao Paulo (BR); Elcio R. Favare, Sao Paulo (BR); Carlos M. R. Guimaraes, Sao Paulo (BR); Eduardo J. B. de M. Joia, Carmel, NY (US); Joao A. de Almeida Neto, Sao Paulo (BR); Alonso P. dos Santos, Sao Paulo (BR); Igor R. dos Santos, Valinhos (BR); Paul Sorelli, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/273,440

(22) Filed: Oct. 14, 2011

(65) Prior Publication Data

US 2013/0097077 A1    Apr. 18, 2013

(51) Int. Cl.
*G06Q 40/00* (2012.01)
*G06Q 20/10* (2012.01)
*G07F 19/00* (2006.01)

(52) U.S. Cl.
CPC ............ *G06Q 40/00* (2013.01); *G06Q 20/1085* (2013.01); *G07F 19/20* (2013.01); *G07F 19/211* (2013.01); *G07F 19/206* (2013.01)
USPC .................................. 705/43; 705/35; 705/39

(58) Field of Classification Search
CPC .... G06Q 40/00; G06Q 20/1085; G07F 19/20; G07F 19/2011; G07F 19/206
USPC ............................................. 705/43, 35, 39
See application file for complete search history.

(56) References Cited

U.S. PATENT DOCUMENTS

| 5,060,153 | A  | * | 10/1991 | Nakagawa .................... 705/43 |
| 6,507,823 | B1 | * | 1/2003  | Nel ............................... 705/27.1 |
| 6,947,902 | B2 | * | 9/2005  | Shah et al. ................... 705/7.33 |
| 7,737,950 | B2 |   | 6/2010  | Drummond et al. |
| 7,747,527 | B1 |   | 6/2010  | Korala |
| 8,301,565 | B2 | * | 10/2012 | Cantley et al. ................ 705/43 |
| 2001/0002468 | A1 | * | 5/2001 | Nel ............................... 705/26 |
| 2001/0037300 | A1 |   | 11/2001 | Miyazaki et al. |

(Continued)

OTHER PUBLICATIONS

Reich, K. E. (1982). ATM network choice should stress costs, local convenience. Savings and Loan News, 103(8), 78-78. Retrieved Mar. 21, 2013.*

(Continued)

*Primary Examiner* — Kito R Robinson
(74) *Attorney, Agent, or Firm* — Law Offices of Ira D. Blecker, P.C.

(57) ABSTRACT

An automated teller machine (ATM) which includes a plurality of peripherals including a user interface for interacting with a user providing user information; a plurality of virtual automated teller machines (VATMs) resident in the ATM, the VATMs networked to a plurality of financial institutions, each VATM capable of using its own ATM software application and capable of providing its own menu of banking options to the user; and an interface to communicate between the VATMs and the plurality of peripherals, receive the user information from the user interface, identify the user's financial institution, link the user with the user's financial institution through a selected VATM corresponding to the user's financial institution and provide the menu of banking options to the user as if the user were using an ATM dedicated to the user's financial institution.

19 Claims, 4 Drawing Sheets

(56) References Cited

U.S. PATENT DOCUMENTS

| | | | |
|---|---|---|---|
| 2002/0032656 A1 | 3/2002 | Chen | |
| 2003/0066876 A1* | 4/2003 | Goldman et al. | 235/379 |
| 2005/0171907 A1 | 8/2005 | Lewis | |
| 2006/0004660 A1 | 1/2006 | Pranger | |
| 2006/0089908 A1* | 4/2006 | Keohane et al. | 705/43 |
| 2009/0032579 A1* | 2/2009 | Gardner | 235/379 |
| 2010/0332388 A1 | 12/2010 | Rielly et al. | |
| 2011/0016047 A1 | 1/2011 | Wu et al. | |

OTHER PUBLICATIONS

Ringer, R. (Mar. 31, 1983). 14 ill. banks join ATM sharing system. American Banker. Retrieved Mar. 21, 2013.*

"Is a New Business and Technology Model Required for the ATM Channel?" Level Four Software, Nov. 2005, pp. 1-12. Retrieved from the internet:URL: http://www.levelfour.com/whitepapers/whitepaper_ATMchannel.pdf.

"Emerging_Trends_in_it From_Business_Enabler_to_Business_Driver August" 2007 KPMG in India. Retrieved from the internet: URL:http://www.kpmg.com/IN/en/IssuesAndInsights/ThoughtLeadership/Emerging%20Trends%20in%20IT%20From-%20Business%20Enabler%20to%20Business%20Driver%20-%20August%202007.pdf.

Candice Zarr, "Cashing in:Automated Teller Machines", pp. 1-5 (downloaded Apr. 26, 2011). Retrieved from the internet: URL:http://www.atariarchives.org/deli/teller_machines.php.

"ATM automatic teller machine", Editor: Cornelis Rabat, pp. 1-12 (downloaded May 6, 2011). Retrieved from the internet: URL: http://www.thocp.net/hardware/atm.htm.

"Competition in ATM Markets: Are ATMs Money MAchines?" Congressional Budget Office, Jul. 1998, pp. 1-3 (downloaded Apr. 26, 2011). Retrieved from the internet: URL: http://www.cbo.gov/doc.cfm?index=666&type=0&sequence=0.

"Wikipedia—Automated Teller Machine" , pp. 1-20. (Downloaded Apr. 26, 2011). Retrieved from the internet: URL: http://en.wikipedia.org/wiki/Automated_teller_machine.

"History of Automated Teller Machines" (downloaded Apr. 26, 2011). Retrieved from the internet: URL:http://atm.sigcis.org/.

"Automated Teller Machines (ATM)", USAID, pp. 1-6 (downloaded May 6, 2011). Retrieved from the internet: URL: http://www.microlinks.org/file_download.php/6.+ATMs+Tech+Brief.pdf?URL_ID=13243&filename=116005920716._ATMs_Tech_Brief.pdf&filetype=application%2Fpdf&filesize=266005&name=6.=ATMs=Tech+Brief.pdf&location=user-S/.

\* cited by examiner

AUTOMATED TELLER MACHINE WITH VIRTUAL BANK SHARING

BACKGROUND

The exemplary embodiments relate to automated teller machines and, more particularly, relate to automated teller machines that contain multiple virtual automated teller machines that each execute the application of a different financial institution's and other industry sector that use automated teller machine.

Automated banking machines are well known. A common type of automated banking machine used by consumers is an Automated Teller Machine (hereinafter "ATM"). ATMs enable customers to carry out a variety of banking transactions by interacting with the machine rather than a human teller. Examples of banking transactions that are commonly carried out using ATMs may include such as withdrawals, deposits, transfer of funds between accounts, payment of bills, and account balance inquiries and any other products that an entity may want to enable to their customers. The types of transactions that a customer may carry out at a particular ATM are determined by hardware and software configuration of that particular ATM as well as the hardware and software configuration of the financial institution to which the particular ATM is connected.

The architecture of prior art ATMs renders these machines extremely inflexible. The functionality offered through an ATM is fixed at the time the ATM is physically installed or physically visited for purposes of upgrading the machine and ATM application installed in the ATM machine.

Prior art ATMs are typically connected to proprietary communications networks in order to allow customers to use ATMs provided by those other than its own financial institution. These networks interconnect the ATMs operated by financial institutions and other entities. Some examples of these networks include the NYCE™ and STAR™ systems. The interconnection capability of these networks enables a user to access his accounts at his own financial institution while using a banking machine operated by a different financial institution. When using such a "foreign" ATM, the user is limited to the transaction options provided by the foreign institution and the options available at the specific ATM being used.

A foreign institution's ATMs may also provide more, less, or a different type of transaction than the user is familiar with at their home institution's ATMs. For example, the ATMs at the user's home financial institution may enable the transfer of funds between the user's accounts. If the foreign institution does not provide this capability, the user will be unable to perform this familiar (and sometimes necessary) function when operating the foreign ATM machine.

A foreign institution's ATM also lacks the ability to market directly to the user. For example, the foreign institution's ATM may provide functions, services or products which are not available at the user's home institution.

Financial institutions have high costs to maintain a private network of ATMs. A private network that allows financial institutions to develop and deploy their ATM applications, customized for their business needs, and maintains such private ATM network is very costly for financial institutions due to the high amount of required investments in ATM equipment, hardware, software and network maintenance, operating cash supply and risks related to vandalism.

The solution available for financial institutions that do not want to maintain a private network of ATMs is to outsource the financial institutions' ATM requirements to the proprietary communications networks mentioned previously. Services available in a shared ATM network are standardized among banks, so that everyone uses the same features or types of transactions.

If a financial institution wants to implement a new strategic product for their clients, in order for such product to be available in the shared ATM environment, it will need to be developed and deployed by the proprietary communications network and the new features will be deployed to all banks that are using this shared ATM network. Financial institutions have no flexibility to provide new strategic products, since the facility will be available to all banks that use this shared ATM network.

Moreover, each project to develop new products in the shared ATM network requires many months for development and implementation modifications, tests and approvals by the proprietary communications network to make the new service available at the ATMs.

BRIEF SUMMARY

The various advantages and purposes of the exemplary embodiments as described above and hereafter are achieved by providing, according to a first aspect of the exemplary embodiments, an automated teller machine (ATM) which includes a plurality of peripherals including a user interface for interacting with a user providing user information; a plurality of virtual automated teller machines (VATMs) resident in the ATM, the VATMs networked to a plurality of financial institutions, each VATM capable of using its own ATM software application and capable of providing its own menu of banking options to the user; and an interface to communicate between the VATMs and the plurality of peripherals, receive the user information from the user interface, identify the user's financial institution, link the user with the user's financial institution through a selected VATM corresponding to the user's financial institution and provide the menu of banking options to the user as if the user were using an ATM dedicated to the user's financial institution.

According to a second aspect of the exemplary embodiments, there is provided an automated teller machine (ATM) which includes a plurality of peripherals including a user interface for interacting with a user providing user information; a plurality of virtual automated teller machines (VATMs) resident in the ATM, each VATM of the plurality of VATMs is identified as being affiliated with a different financial institution of a plurality of financial institutions, the VATMs networked to the plurality of financial institutions such that each VATM is networked only to its affiliated financial institution, each VATM capable of using its own ATM software application and capable of providing its own menu of banking options to the user; and an interface to communicate between the VATMs and the plurality of peripherals, receive the user information from the user interface, identify the user's financial institution, link the user with the user's financial institution through a selected VATM corresponding to the user's financial institution and provide the menu of banking options to the user as if the user were using an ATM dedicated to the user's financial institution.

According to a third aspect of the exemplary embodiments, there is provided a method of handling a financial transaction at an automated teller machine (ATM) including a plurality of virtual automated teller machines (VATMs) resident in the ATM, the VATMs networked to a plurality of financial institutions, each VATM capable of providing its own ATM software application and menu of banking options to the user. The method includes responsive to a user providing user information, interacting with the user to learn an identity of a user's financial institution; identifying the user's financial institution to the user; loading resources for the VATM affiliated with the user's financial institution into the ATM; displaying to the user a menu of banking options from the user's financial institution, the banking options being provided by the VATM affiliated with the user's financial institution; responsive to the user initiating a financial transaction with the VATM affiliated with the user's financial institution, executing the financial transaction by the financial institution; and releasing the resources for the VATM affiliated with the user's financial institution.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

Figure 1:
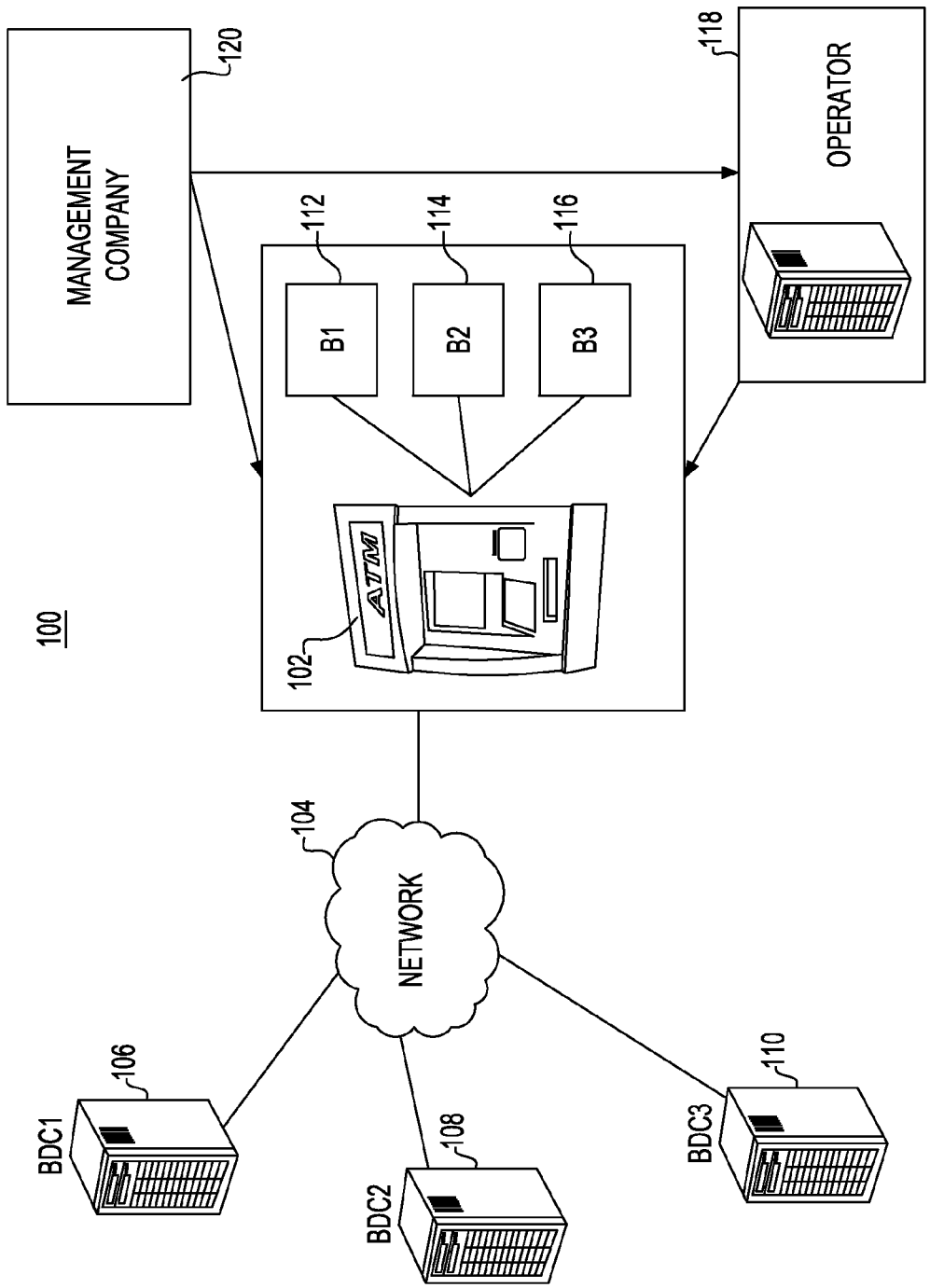
FIG. 1 is an illustration of a shared ATM network according to the exemplary embodiments.

The exemplary embodiments may resolve the problems with the conventional shared ATM environment and may offer the following benefits to financial institutions:

All ATM equipment is transparently shared.

A financial institution's customers will have the same experience to use an ATM outside of the financial institution's premises when compared with ATMs within a branch of the financial institution.

Financial institutions may use their personalized applications on the shared ATM environment.

The development of software applications for the ATM platform is simplified and financial institutions will not need to develop hardware components for their applications.

The financial institution may focus on business development, facilitating the creation of new products in their software ATM application.

There is flexibility to increase coverage using a virtualized and dynamic method.

There is "go to the market" improvement and agility for the marketing team to rapidly launch new products for ATM customers.

Innovation and strategic differentiation are protected against competitors that are using the same shared ATM network.

Financial institutions are able to publish marketing programs (Merchandising) while the ATM machine is idle.

The exemplary embodiments provide the financial institutions with the ability to quickly provide new, innovative and strategic products with key differentiators that will promote the competition in this market.

The exemplary embodiments are based on an architecture for virtually sharing ATM equipment, which financial institutions use to deploy their applications. Each financial institution will have a segregated environment in the ATM, provided by a virtualized method with event management and alarms that are generated related to:

Infrastructure;

Availability of application ATM for each financial institution;

Consumption of computational resources (CPU, Disk and Memory);

Software distribution to update new versions of ATM applications for each financial institution, according to their demand;

Physical events such as open door, open cash dispenser, printing;

Sensor of hardware security, anti-skimming;

Energy consumption, voltage and temperature measurements;

Transactions;

Cash withdrawal;

On screen and printed extracts;

Consumables supply and usage (paper and cash).

The exemplary embodiments further will enable standardization of the communication between the financial institution's applications and a "Bank Orchestrator", which manages the ATM. The financial institution's applications will only manage information that is generated at the ATM and authorized by the financial institution. The ATM may be managed by a management layer. The exemplary embodiments will have all of the communication drivers for translating the information generated by the ATM equipment and financial institution's applications, including financial institution authorization to release funds from the ATM.

In the discussion that follows, "financial institutions" may be referred to as "banks" but it should be understood that the banks may perform functions other than traditional banking functions. Rather, banks as referred to herein may be any institution that performs financial or business transactions of any kind.

Further, an automated teller machine or ATM may be a conventional ATM, kiosk, point of sale device at a merchant, a self check-out device at a merchant, ticket issuing device at a subway or airport, gas pump or other similar kiosk type devices that provides services via a card similar to an ATM.

Also, a customer and user may be used interchangeably herein.

Referring to the Figures in more detail, and particularly referring to FIG. 1, there is illustrated a shared ATM network 100 according to the exemplary embodiments. ATM 102 may be connected by a secure network 104, such as a proprietary communications network mentioned previously, to a plurality of bank data centers (BDCs) including BDC1 106, BDC2 108 and BDC3 110. Resident within ATM 102 may be a plurality of virtual ATMs (VATMs) represented as VATM B1 112, VATM B2 114 and VATM B3 116. The VATMs may also be referred to as guest ATMs. Each VATM may be linked to a BDC and may be permitted to perform functions authorized by the BDC. The VATMS 112, 114, 116 will generally have a one to one correspondence with the BDCs 106, 108, 110. That is, VATM B1 112 corresponds with BDC1 106, VATM B2 114 corresponds with BDC2 108 and VATM B3 116 corresponds with BDC3 110.

While only three VATMs and their corresponding three BDCs are shown in FIG. 1, it should be understood that there may be many more VATMs running on ATM 102 along with their corresponding BDCs.

When a customer desires to use the ATM 102, the customer's home bank may be identified and thereafter a VATM, for example VATM B1 112, corresponding to the customer's home bank (BDC1 106 in this example) may be displayed for the customer to use and perform financial transactions such as deposits, bank balance, transfers, bill payment, etc. Any financial transaction that the customer performs on the VATM B1 112 will appear as if the customer is using an ATM at a branch of the customer's home bank.

When a second customer desires to use the ATM 102, the second customer's home bank may be identified and thereafter a VATM, for example VATM B2 114, corresponding to the second customer's home bank (BDC2 108 in this example) may be displayed for the customer to use and perform financial transactions. The financial transactions that the second customer may perform using VATM B2 114 may be the same or different financial transactions that the first customer using VATM B1 112 may be able to perform. Any financial transaction that the second customer performs on the VATM B2 114 will appear as if the second customer is using an ATM at a branch of the second customer's home bank.

In both of the above examples, it is assumed that the ATM 102 is not at a branch of the first customer's home bank or the second customer's home bank such that the first and second customers are using a "foreign" ATM for their financial transactions. However, because of the virtualization of each customer's ATM at the foreign ATM, this assumption is not important to the customer since the transaction may appear as if each customer is using their home ATM even if they are not.

Further shown in FIG. 1 is an operator 118 responsible for managing the shared ATM network 100 and providing local and remote services. There may also be a management company 120 responsible for managing the services provided by the operator 118. In some implementations, the management company 120 and the operator 118 may be the same entity.

The management company 120 is the entity that may provide management control of all ATM machines, such as availability and measure key performance indicators. The management company 120 may also provide information technology services for the operator 118. The operator 118 is owner of the ATM machines and controls the business process and contracts all service providers to maintain the ATM machines up and running. The operator 118 may also be responsible for business processes such as: cash management and interfacing with banks or another company that may want to share other entity.

The exemplary embodiments allow for shared ATM network 100 to have several banks sharing physical equipment and their peripherals using the ATM applications developed by each bank.

The ATM 102 may have an "Infrastructure Domain" component for virtualized environments management, security and monitoring of physical and virtual transactions. The Infrastructure Domain component is created for each VATM environment and for each bank that is sharing the ATM network 100.

In these virtual environments, an "Application Domain" component may be installed in each ATM 102, to host applications of each bank. These applications, hosted by the Application Domain may communicate with the Infrastructure Domain to allocate physical resources at the shared ATM 102.

The Infrastructure Domain component may manage events and alarms generated by the applications in the Application Domain or the ATM equipment itself, such as resource utilization, availability, transactions, resource consumption, sensors (temperature, voltage, open doors, printer, vandalism, anti-skimming). The Infrastructure Domain component is also responsible for performing hardware initialization remotely connected to the ATM network, software distribution, and updating the applications in the Application Domain with the software/component versions requested by each bank.

Whenever an ATM user starts using the ATM 102, the Infrastructure Domain component may identify the user and the bank, and may allocate the physical resources to the virtual ATM environment, according to the Application Domain requirements of the requested bank.

When the ATM user finishes using the ATM 102, the Infrastructure Domain component may release the physical resources of the Application Domain that were being used, and keep the ATM 102 available for use by the next ATM user.

While the shared ATM 102 is idle, the Infrastructure Domain may start sessions for merchandising programs or advertising using screen saver features of the ATM equipment.

The major elements of the exemplary embodiments may be:

Virtualized software to provide a virtual machine for the VATM environments for each bank that may use the shared ATM network;

Virtual ATM applications developed/customized by each bank. All banks have these applications running on their bank branches.

Software applications owned by the operator responsible for the Infrastructure Domain to provide overall system management of the shared environment, recognition of and assignment of physical resources (peripherals) to the virtualized resources, generating events and alarms for the physical elements (equipment) and logical elements (from the Application Domain and Infrastructure Domain).

Monitoring and Automation Software to correlate events generated and consolidate them in the Infrastructure Domain for processing information so that it can generate an output of strategic and operational information from the virtualized environment.

ATM equipment using off-the-shelf peripherals.

The innovative aspect of the exemplary embodiments relies on the capability of having multiple banking applications running on the ATM equipment simultaneously and totally independent from each other. To achieve this goal, a virtual ATM architecture was created which makes it possible to have VATMs running on a Host ATM.

A difference between the shared ATM architecture of the exemplary embodiments and a common system virtualization is that there is more than just sharing of computer resources like CPU, memory, disk and network. The Guest ATMs or VATMs need to interact with the Host peripherals in an exclusive way, depending on the user operational policies, defined by the banks and the sector regulatory institutions. To support this exclusive characteristic, a component called an Orchestrator was created. The Orchestrator manages the VATMs' peripherals access orchestrated by pre-defined operational policies. The functions of the Orchestrator are described in further detail with respect to FIG. 4.

Figure 2:
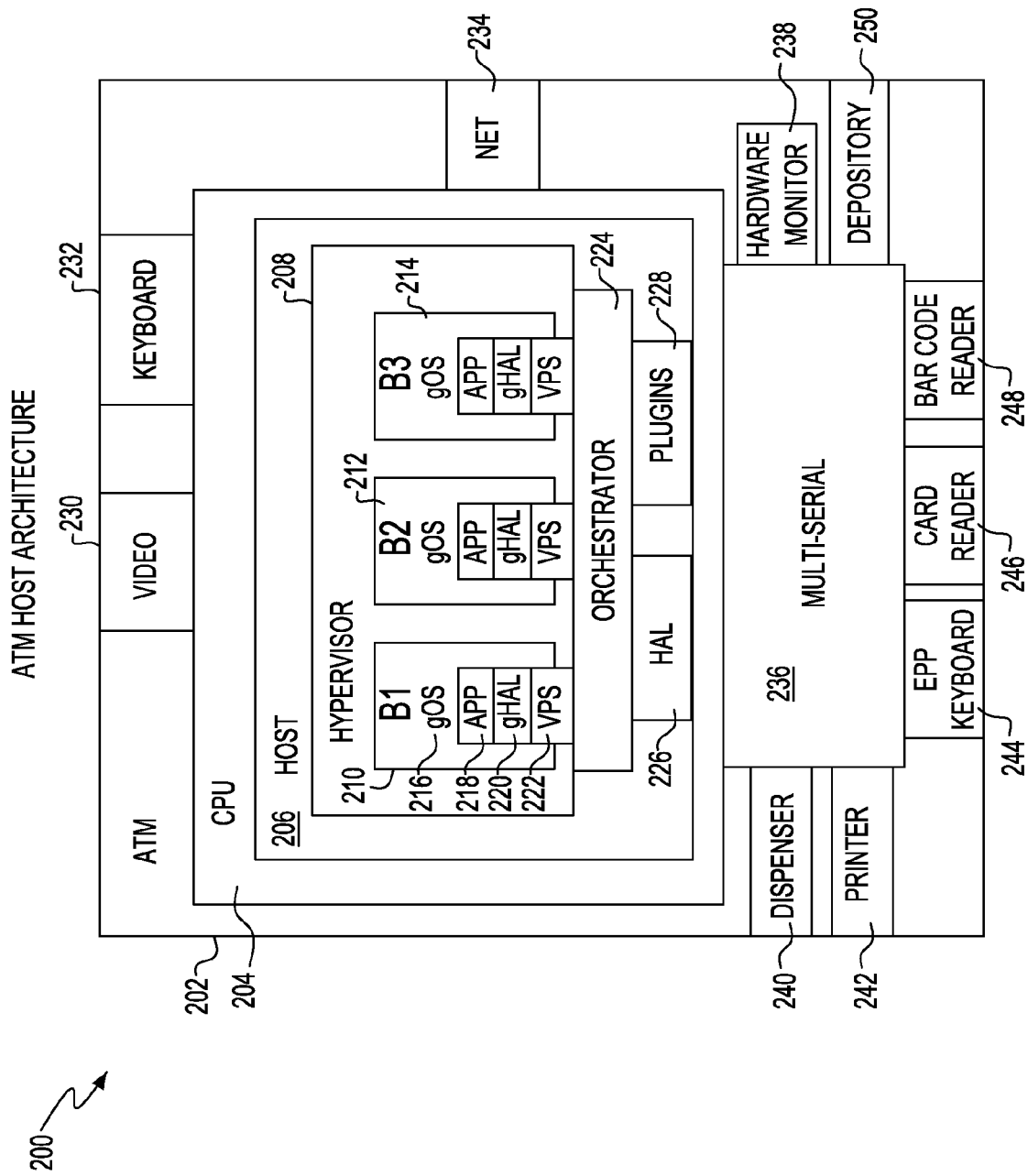
FIG. 2 is an illustration of the architecture of an ATM implementing the exemplary embodiments.

Referring now to FIG. 2, there is illustrated the ATM host architecture 200 for the ATM 202. The ATM 202 includes a central processing unit (CPU) 204, a host operating system 206 and a hypervisor 208.

The hypervisor 208 may also be referred to as a virtual machine manager and allows multiple operating systems, termed guests, to run concurrently on the host 206. The hypervisor 208 presents to the guest operating systems a virtual operating platform and manages the execution of the guest operating systems. Multiple instances of a variety of operating systems may share the virtualized hardware resources.

In the exemplary embodiments, hypervisor 208 allows guest ATMs B1 210, B2 212 and B3 214 to run on host 206. Each guest ATM may include a variety of components. For purposes of illustration and not limitation, guest ATM B1 210 may include a guest operating system 216, guest applications 218, guest hardware abstraction layer 220 and virtual peripheral modules 222. Guest ATMs B2 212 and B3 214 may have similar components.

While only three guest ATMs are shown in FIG. 2, it should be understood that there may be many more guest ATMs running on ATM 202.

The ATM host architecture 200 may further include an orchestrator 224 for managing the guest ATMs' access to the peripherals of the ATM 202. The orchestrator 224 may have plugins 228 for additional features such as charging, systems monitoring and cash and consumables logistic support. The orchestrator 224 interfaces with the host hardware abstraction layer 226.

The ATM host architecture 200 may further include a CPU video interface 230, a CPU keyboard interface 232 and a CPU network interface 234.

The CPU 204 may have a multi-serial interface 236 for interfacing with the peripherals of the ATM 202 and a hardware monitor 238.

The ATM peripherals may include a cash dispenser 240, a printer 242, a cryptographic keyboard 244, card reader 246, bar code reader 248 and depository for receiving deposits 250. There may be other peripherals as well.

In the ATM host architecture 200, the various guest ATMS B1 210, B2 212, B3 214 may operate independently and display various menu options to an ATM customer depending on which guest ATM is linked to the ATM customer's bank through a network (such as network 104 in FIG. 1) and BDC (such as BDC1, BDC2 or BDC3 shown in FIG. 1). The ATM customer's access to the ATM peripherals is controlled by the guest ATM and the orchestrator 224.

Figure 3:
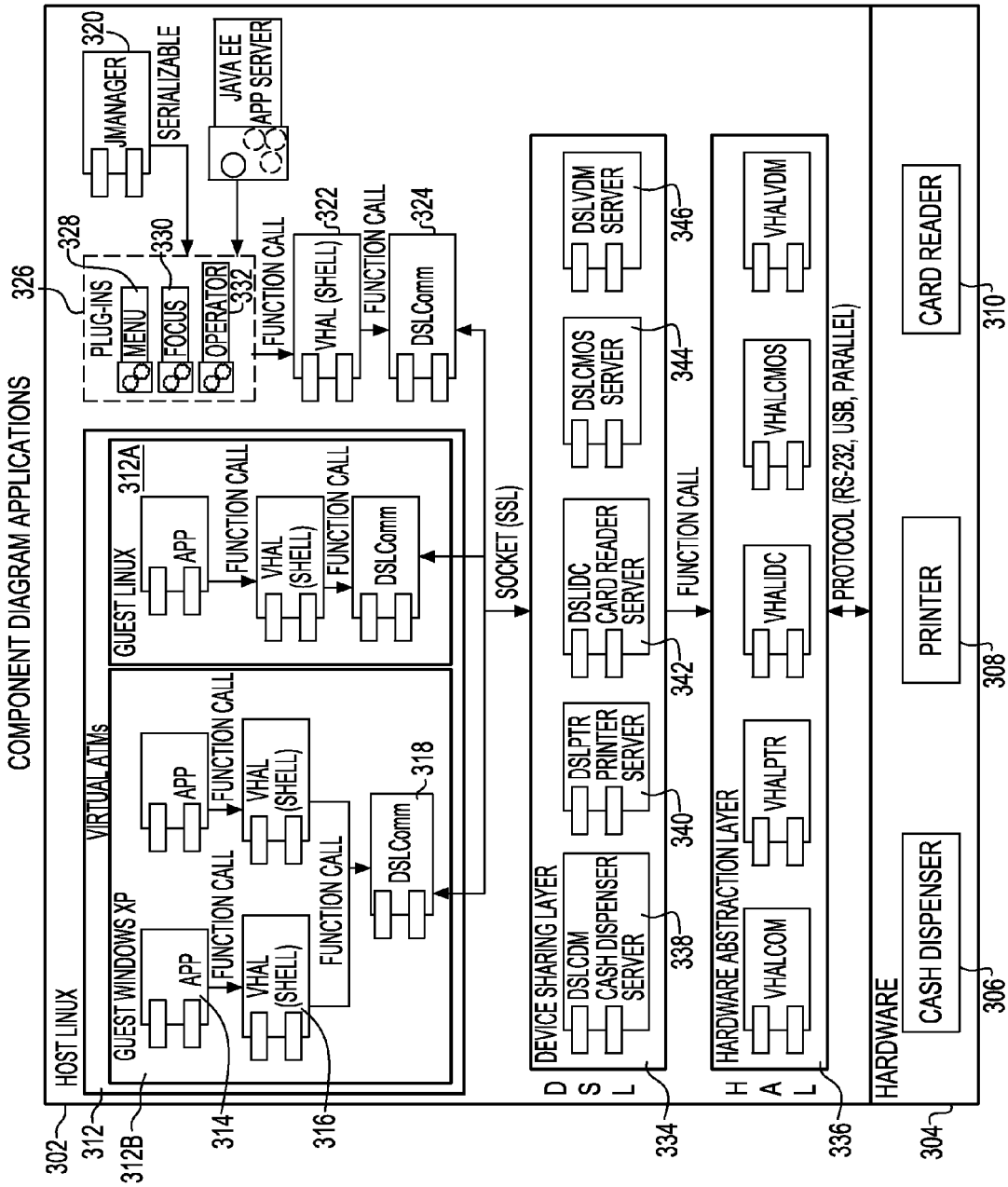
FIG. 3 is an illustration of the components of the ATM implementing the exemplary embodiments.

Referring to FIG. 3, there are shown, for purposes of illustration and not limitation, components of the ATM implementing the exemplary embodiments. In particular, shown in FIG. 3 are the host operating system 302 and the peripherals 304. While only the cash dispenser peripheral 306, printer peripheral 308 and card reader 310 are shown in FIG. 3, it should be understood that the peripherals may include the peripherals shown in FIG. 2 as well as other peripherals not shown.

The host operating system 302 may run on Linux as shown in FIG. 3 or another operating system. Included within the host operating system 302 are the virtual ATMs, one of which is virtual ATM (VATM) 312. The operating system for the VATM 312 may be Linux, as shown as 312A, or a Windows operating system such as Windows XP shown as 312B. Regardless of the operating system, the VATM 312 will contain bank applications 314 that execute the home bank's ATM applications. In this way, no matter which ATM a customer uses, a customer may always have access to the same ATM applications that the customer's home bank uses. The VATM 312 further includes a VHAL (shell) 316 that is a hardware abstraction layer to be used as an interface to allow the bank applications 314 to access the ATM peripherals 304. More specifically, the VHAL (shell) 316 communicates between the bank applications 314 and the Device Sharing Layer to be discussed hereafter. Each VATM 312 also includes a DSL Comm 318 which receives commands from the VHAL (shell) 316 and forwards them to the Device Sharing Layer.

The host operating system 302 further includes a JManager 320 which is responsible for workload management of all components and also controls access to the virtual machines through VHAL (shell) (hardware abstraction layer) 322 and DSL Comm 324. JManager 320 may be a Java application but the particular computer language utilized is not important to the exemplary embodiments.

The JManager 320 allows for the extension of its functionality through the use of plug-ins 326. The menu plug-in 328, focus plug-in 330 and operator plug-in 332 are three such plug-ins. There may be additional plug-ins as required to implement the exemplary embodiments. The menu plug-in 328 may display various banks and allow the user to select their bank and thereafter notify the JManager 320 of the bank selected by the user. The focus plug-in 330 may perform context switching between applications, both for those running on the host and those running on the VATMS. The operator plug-in 332 may cover operational transactions of the ATM equipment such as opening and closing doors, supply, gathering, testing devices, loading of cryptographic keys, etc.

The device sharing layer or DSL 334 was alluded to earlier. The DSL 334 is also the orchestrator shown in FIG. 2. The DSL 334 is the component responsible for the sharing of peripherals and supports the VATMs 312 and the bank environment. The communication with the peripherals 304 is done via function calls to the hardware abstraction layer (HAL) 336. The DSL 334 includes several components illustrated in FIG. 3. There may be other components as required to implement the exemplary embodiments. DSL CDM 338 may provide an interface to the cash dispenser peripheral 306, DSL PTR 340 may provide an interface to the printer peripheral 308 and DSL IDC 342 may provide an interface to the card reader peripheral 310. DSL CMOS 344 may record transactions at the peripherals such as the cash dispenser peripheral 306, printer peripheral 308 and card reader peripheral 310. In addition, the DSL CMOS 344 may be responsible for the overall management of the DSL 334. DSL VDM 346 may record keystrokes and touches from a touchscreen if one is present.

The HAL 336 may include components corresponding to each of the DSL components to translate the DSL commands into commands that the peripherals 304 can understand and execute on.

Figure 4:
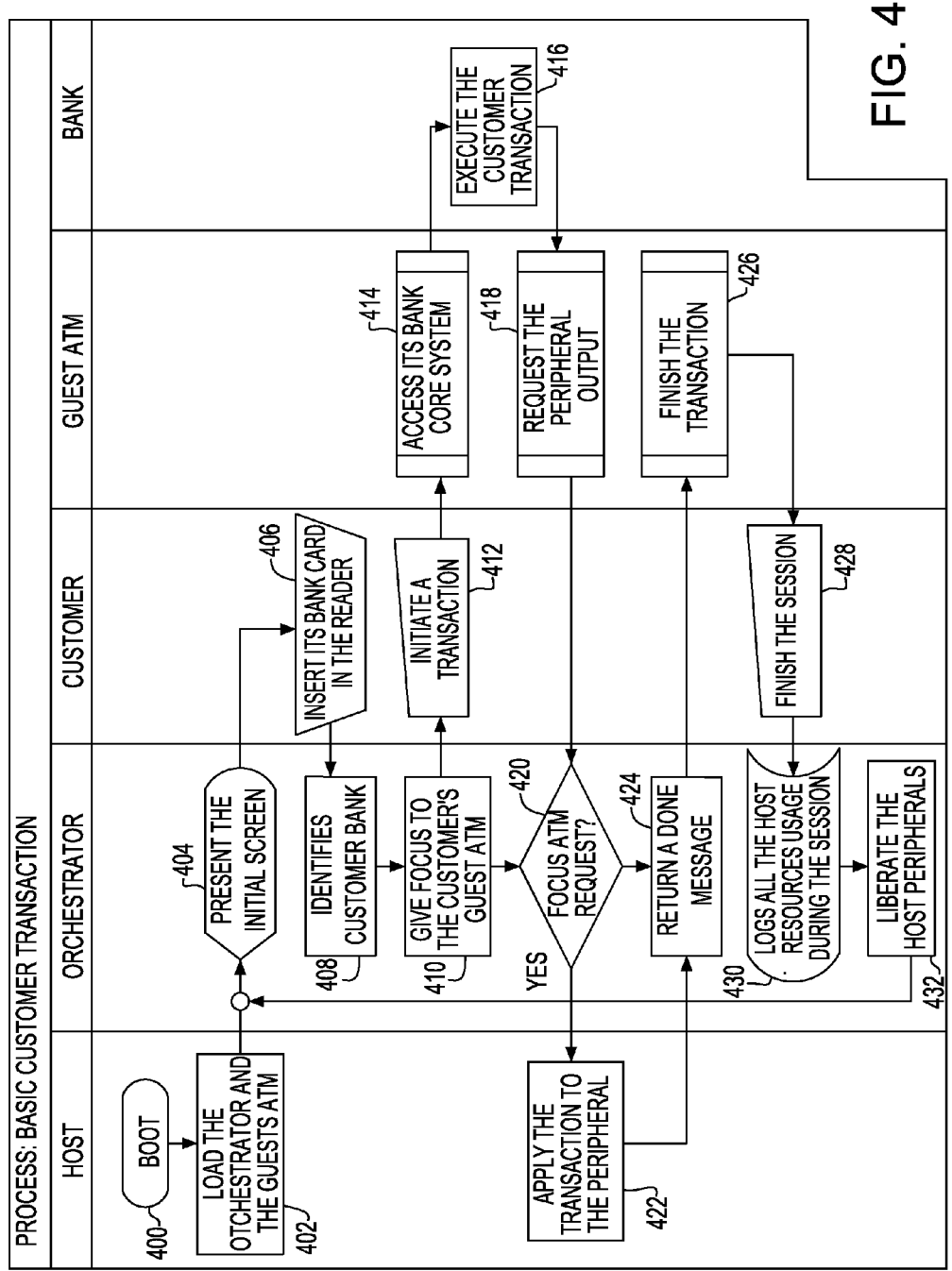
FIG. 4 is a flow chart illustrating a customer transaction using the ATM implementing the exemplary embodiments.

Referring now to FIG. 4, there is shown a workflow for processing a customer transaction.

When the host is powered on, the boot process, block 400, starts loading the operational system that will be responsible to start the orchestrator instead of the standard shell. The orchestrator loading process, block 402, checks the environment integrity before it starts running. If the checking fails, the orchestrator aborts the booting process and the machine goes on maintenance (not shown in FIG. 4).

On check success, the orchestrator starts all "Guest" ATM applications, block 402, While each virtual ATM has been started, the orchestrator does not yet allow its selection by the customer since the "Guest" application is not yet ready to interact with the Customer. As soon as each "Guest" application sends a ready status to the orchestrator, the Customer will be able to select and interact with the "Guest" application. The orchestrator shows the initial screen on the ATM, block 404. The initial screen allows the selection of the "Guest" application the Customer may want to interact with. The initial screen may also identify the banking network or display commercial advertising.

The customer may insert his bank card, such as a debit card or credit card, in the card reader of the ATM, block 406, to select the "Guest" application. The orchestrator reads the bank card to identify which virtual machine has been associated to the read bank card, block 408.

With the "Guest" application identified, the orchestrator may execute the following actions:
- Set the correspondent virtual ATM to get the focus on the ATM screen, block 410;
- Enable all peripherals to be controlled by the selected "Guest" application;
- Inform the "Guest" application that there is a Customer present; and
- Enable the Customer to start the interaction with the "Guest" application to perform the desired transaction.

The Customer may interact with the ATM to initiate a transaction, block 412. The customer may interact with the ATM as the customer is used to interacting with the customer's home bank owner's ATM using keyboard, touch screen, side keys or any other regular interface available on the ATM. At this moment, the "Guest" application appearing on the screen to the Customer will operate as the Customer's home bank application on the customer's home ATM. The Customer may select the desired bank transaction such as withdraw, balance or any other business transaction.

The "Guest" application accesses the home bank's core system (such as a bank data center) over the private network by sending the correspondent transaction request to the Bank core system, block 414.

The home bank core system validates, analyzes and interprets the transaction request message (withdraw, balance or any other) and, assuming the request is valid, executes the transaction, block 416. The home bank core system additionally sends a reply message to the "Guest" application.

The "Guest" application receives the banking reply message enabling the transaction, processing the reply message and generating a specific set of peripheral commands, block 418, to fulfill the Customer's transaction request (money, printout or any other available operation).

As the "Guest" application does not have direct access to the peripherals any longer, the orchestrator will arbitrate, block 420, the access to the peripherals. If the "Guest" application that sent the commands is not the "Guest" application on focus (that is, it is a "Guest" application that is not interacting with the Customer), the orchestrator emulates the peripheral to return a proper result message to the "Guest" application, block 424, but does not send the commands to the peripheral.

If the "Guest" application that sent the commands is the "Guest" application on focus (that is, it is the "Guest" application that is interacting with the Customer), the orchestrator applies the command to the peripheral, block 422, and returns the proper execution result message, block 424, to the "Guest" application.

When the "Guest" application receives the result message from the peripheral, the "Guest" application will complete the transaction, block 426, and the customer may finish the interaction with the "Guest" application, block 428, by terminating the session in some manner or perhaps selecting a new transaction to be performed.

With the Customer transaction finished, the orchestrator logs all the ATM resources used by the "Guest" application, block 430, for a future billing process. The "Guest" application then goes out of focus while the direct connection to the peripherals is terminated, block 432. The orchestrator then presents the initial screen while waiting for a new Customer, block 404.

As will be appreciated by one skilled in the art, aspects of the exemplary embodiments may be embodied as a system, method or computer program product. Accordingly, aspects of the exemplary embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the exemplary embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the exemplary embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the exemplary embodiments are described above with reference to flowchart illustrations and/or block diagrams of methods, apparatus (systems) and computer program products according to the exemplary embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to the exemplary embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. An automated teller machine (ATM) comprising:
a host operating system to host a plurality of virtual automated teller machines (VATMs) resident in the ATM;
a plurality of peripherals including a user interface for interacting with a user providing user information;
the VATMs networked to a plurality of financial institutions, each VATM having its own operating system separate from the host operating system, its own ATM software application resident in the ATM, its own menu of banking options resident in the ATM for providing to the user, and its own virtual peripheral modules to control access of the each VATM to the plurality of peripherals; and
an interface to communicate between the VATMs and the plurality of peripherals, receive the user information from the user interface, identify the user's financial institution, link the user with the user's financial institution through a selected VATM corresponding to the user's financial institution and provide the menu of banking options to the user as if the user were using an ATM dedicated to the user's financial institution.

2. The ATM of claim 1 wherein responsive to user input to the selected VATM, the interface communicating with the peripherals to provide an output to the user.

3. The ATM of claim 2 wherein the output is a printed receipt.

4. The ATM of claim 2 wherein the output is cash.

5. The ATM of claim 1 wherein each VATM of the plurality of VATMs further comprises a plurality of automated teller applications resident in the ATM from the financial institution networked to the each VATM, the plurality of automated teller applications for the selected VATM corresponding to the menu of banking options provided to the user.

6. The ATM of claim 1 wherein each VATM of the plurality of VATMs is identified as being affiliated with a different financial institution and the each VATM is networked only to that financial institution.

7. The ATM of claim 6 wherein the ATM is identified as being affiliated with a financial institution and wherein there is at least one VATM that is affiliated with a different financial institution than the financial institution that is affiliated with the ATM.

8. The ATM of claim 1 wherein a VATM may be modified without modifying any other VATM.

9. The ATM of claim 1 wherein responsive to instructions from a financial institution affiliated with a VATM, the VATM may be modified without modifying any other VATM.

10. The ATM of claim 1 wherein the ATM software application and menu of banking options for each VATM are implemented by the each VATM.

11. An automated teller machine (ATM) comprising:
a host operating system to host a plurality of virtual automated teller machines (VATMs) resident in the ATM;
a plurality of peripherals including a user interface for interacting with a user providing user information;
each VATM of the plurality of VATMs is identified as being affiliated with a different financial institution of a plurality of financial institutions, the VATMs networked to the plurality of financial institutions such that each VATM is networked only to its affiliated financial institution, each VATM having its own operating system separate from the host operating system, its own ATM software application resident in the ATM, its own menu of banking options resident in the ATM for providing to the user, and its own virtual peripheral modules to control access of the each VATM to the plurality of peripherals; and
an interface to communicate between the VATMs and the plurality of peripherals, receive the user information from the user interface, identify the user's financial institution, link the user with the user's financial institution through a selected VATM corresponding to the user's financial institution and provide the menu of banking options to the user as if the user were using an ATM dedicated to the user's financial institution.

12. The ATM of claim 11 wherein responsive to user input to the selected VATM, the interface communicating with the peripherals to provide an output to the user.

13. The ATM of claim 11 wherein each VATM of the plurality of VATMs further comprises a plurality of automated teller applications resident in the ATM from the financial institution networked to the each VATM, the plurality of automated teller applications for the selected VATM corresponding to the menu of banking options provided to the user.

14. The ATM of claim 11 wherein the ATM is identified as being affiliated with a financial institution and wherein there is at least one VATM that is affiliated with a different financial institution than the financial institution that is affiliated with the ATM.

15. The ATM of claim 11 wherein responsive to instructions from a financial institution affiliated with a VATM, the VATM may be modified without modifying any other VATM.

16. The ATM of claim 11 wherein the ATM software application and menu of banking options for each VATM are implemented by the each VATM.

17. A method of handling a financial transaction at an automated teller machine (ATM) including a host operating system to host a plurality of virtual automated teller machines (VATMs) resident in the ATM, the VATMs networked to a plurality of financial institutions, each VATM having its own operating system separate from the host operating system, its own ATM software application resident in the ATM, its own menu of banking options resident in the ATM for providing to the user, and its own virtual peripheral modules to control access of the each VATM to the plurality of peripherals, the method comprising:

responsive to a user providing user information, interacting with the user to learn an identity of a user's financial institution;

identifying the user's financial institution to the user from the plurality of financial institutions having VATMs resident in the ATM;

loading resources in the ATM for the VATM affiliated with the user's financial institution into the ATM, such resources including the ATM software application, automated teller applications from the user's financial institution and virtual peripheral modules to enable peripheral resources to be controlled by the VATM affiliated with the user's financial institution;

displaying to the user a menu of banking options from the user's financial institution, the banking options being provided by the VATM affiliated with the user's financial institution;

responsive to the user initiating a financial transaction with the VATM affiliated with the user's financial institution, executing by the financial institution the financial transaction; and releasing the resources for the VATM affiliated with the user's financial institution;

wherein the method is performed on one or more computing devices.

18. The method of claim 17 wherein between responsive to the user initiating a financial transaction and releasing, further comprising:

requesting peripheral resources; and providing an output related to the executed financial transaction to the user from the peripheral resources.

19. The method of claim 17 wherein responsive to instructions from the financial institution affiliated with the VATM, modifying the VATM without modifying any other VATM.

\* \* \* \* \*